Patented May 26, 1931

1,806,988

UNITED STATES PATENT OFFICE

WILLIAM H. TEST, OF REDONDO BEACH, CALIFORNIA

PROCESS FOR PURIFYING PIGMENT MATERIALS

No Drawing. Application filed November 8, 1927. Serial No. 231,995.

This invention relates to a process for purifying pigment materials, and it is an object of the invention to provide a process for effectively and economically purifying pigment materials of iron compounds such as are deleterious to pigments.

Pigment materials such, for example, as barium sulphate, calcium sulphate, titanium compounds, etc., frequently contain iron compounds in forms and amounts which materially interefere with their usefulness and decrease their commercial value. The iron impurity is oxide.

It is a primary object of this invention to provide an effective, practical process for purifying pigment materials of iron compounds such as are referred to above.

It is another object of this invention to provide a process for purifying pigment materials of iron compounds without injuring or decreasing the commercial value of the pigment material.

For purpose of example, I will set forth a typical application and mode of carrying out my invention, it being understood that such description is not to be construed as limiting the invention beyond the limitations set out in the appended claims.

My process, when applied to a typical pigment material such as a titanium compound for the removal of iron compounds, provides, first, the conversion or reduction of the iron to the metallic state and then to a volatile or gaseous state in which it may pass or be driven out of the pigment material. The invention is intended primarily to remove iron compounds capable of being reduced to metallic oxide; for instance, I contemplate the purification of a pigment material in which the iron impurity is oxide. Although my invention provides for a reduction of the iron compounds to the metallic state and then to a volatile or gaseous compound, I do not divide the treatment into a plurality of steps as the process may be carried out in a single continuous operation.

For the treatment of a pigment compound, for example, a titanium compound containing deleterious iron compounds capable of reduction to the metallic state, the material is heated in the presence of carbon monoxide to a temperature and for a period sufficient to convert or reduce the iron compounds to the metallic state. The specific treatment necessary for the reduction of the iron compounds to the oxides may vary considerably with the materials or compounds treated. However, ordinarily heating to about one thousand (1,000) degrees centigrade will result in the reduction of the iron compounds to the metal. The heated body of material is then allowed to cool in the continued presence of carbon monoxide and under conditions such as to cause the metallic iron to be converted to iron carbonyl. Under atmospheric pressure, iron oxides in a finely divided state, as they will occur in the pigment material, will be converted to iron carbonyl in the presence of carbon monoxide at a temperature in the neighborhood of one hundred twenty (120) degrees centigrade. Thus, by cooling the initially heated body of material from a temperature materially above that necessary for the formation of iron carbonyl to a temperature at which the carbonyl is formed, the material is exposed to the desired conditions. The iron carbonyl formed is readily dissipated or distilled off by exposing the body of material to the atmosphere and applying a gentle heat. It is to be understood that the heat thus applied to drive off the iron carbonyl need only be sufficient to accomplish the purpose. In any specific case, this heating may vary, depending upon the exact nature of the material.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. The process of purifying a pigment material to eliminate iron oxides including treating the material to reduce the iron oxides to the metallic state and then subjecting it to carbon monoxide under conditions to form iron carbonyl and then removing the iron carbonyl by heat.

2. The process of purifying a pigment material to eliminate iron oxides including heating the material in the presence of carbon monoxide to reduce the iron oxides to the metallic state and then subjecting it to carbon monoxide under conditions to form iron carbonyl and then removing the iron carbonyl by heat.

3. The process of purifying a pigment material to eliminate iron oxides including heating the material in the presence of carbon monoxide to reduce the iron oxides to the metallic state and then continuing the material in the presence of carbon monoxide at a temperature to form iron carbonyl and then removing the iron carbonyl by heat.

4. The process of purifying a pigment material to eliminate iron oxides including treating the material to reduce the iron to the metallic state, exposing the material to carbon monoxide to form iron carbonyl, and then removing the iron carbonyl by heat.

5. The process of purifying a pigment material to eliminate iron oxides including heating the material in the presence of carbon monoxide to reduce the iron to the metallic state, continuing the material in the presence of carbon monoxide at a temperature to form iron carbonyl, and then heating the material in the atmosphere to drive off the iron carbonyl.

In witness that I claim the foregoing I have hereunto subscribed my name this 21st day of October, 1927.

WILLIAM H. TEST.